(12) United States Patent
Miura et al.

(10) Patent No.: US 8,726,590 B2
(45) Date of Patent: May 20, 2014

(54) FOAM FILLER AND HOLLOW STRUCTURE

(75) Inventors: Kenichi Miura, Inazawa (JP); Koichiro Ohbai, Inazawa (JP); Koji Tokuyama, Toyota (JP)

(73) Assignee: Iida Industry Co., Ltd., Aichen-ken (JP)

( * ) Notice: Subject to any disclaimer, the term of this patent is extended or adjusted under 35 U.S.C. 154(b) by 1143 days.

(21) Appl. No.: 11/903,380

(22) Filed: Sep. 21, 2007

(65) Prior Publication Data

US 2008/0073923 A1 Mar. 27, 2008

(30) Foreign Application Priority Data

Sep. 27, 2006 (JP) .................................. 2006-262393

(51) Int. Cl.
 *E04C 2/00* (2006.01)
 *E04C 1/00* (2006.01)
 *B32B 1/06* (2006.01)
(52) U.S. Cl.
 USPC ...................... 52/232; 52/309.4; 52/1; 428/68
(58) Field of Classification Search
 USPC ........... 428/68, 71; 277/316; 52/1, 2.11, 2.24, 52/309.4, 232; 296/187.01
 See application file for complete search history.

(56) References Cited

U.S. PATENT DOCUMENTS

| | | | | |
|---|---|---|---|---|
| 4,109,423 A * | 8/1978 | Perrain | ................................ | 52/1 |
| 4,136,707 A * | 1/1979 | Gaillot et al. | ..................... | 137/75 |
| 4,269,890 A * | 5/1981 | Breitling et al. | ................. | 428/71 |
| 4,874,650 A | 10/1989 | Kitoh et al. | | |
| 4,898,630 A * | 2/1990 | Kitoh et al. | ..................... | 156/79 |
| 5,155,957 A * | 10/1992 | Robertson et al. | ............... | 52/232 |
| 5,591,386 A * | 1/1997 | Jansen et al. | .................. | 264/46.9 |
| 5,804,608 A * | 9/1998 | Nakazato et al. | ............. | 521/135 |
| 5,979,902 A * | 11/1999 | Chang et al. | ................... | 277/316 |
| 6,099,948 A * | 8/2000 | Paver, Jr. | ..................... | 428/304.4 |
| 6,114,004 A * | 9/2000 | Cydzik et al. | ................... | 428/81 |
| 6,152,260 A * | 11/2000 | Eipper et al. | ................... | 181/296 |
| 6,270,600 B1 * | 8/2001 | Wycech | ........................... | 156/79 |
| 6,491,336 B1 | 12/2002 | Beckmann et al. | | |
| 6,887,060 B2 * | 5/2005 | Miura et al. | ................... | 425/110 |
| 7,249,415 B2 * | 7/2007 | Larsen et al. | ................. | 29/897.2 |
| 7,521,093 B2 * | 4/2009 | Finerman et al. | ............. | 427/375 |
| 7,784,186 B2 * | 8/2010 | White et al. | ................. | 29/897.2 |
| 7,838,100 B2 * | 11/2010 | McLeod et al. | ............... | 428/172 |
| 7,887,724 B2 * | 2/2011 | Ui et al. | ....................... | 264/45.8 |
| 2009/0001758 A1 * | 1/2009 | Hanley et al. | ............ | 296/187.02 |

FOREIGN PATENT DOCUMENTS

| | | |
|---|---|---|
| JP | 64064813 | 3/1989 |
| JP | 01164641 | 6/1989 |
| JP | 10236332 | 9/1998 |
| JP | 2000249121 | 9/2000 |
| JP | 2001-153231 | 6/2001 |
| JP | 2002120759 | 4/2002 |

* cited by examiner

*Primary Examiner* — Elizabeth A Plummer
(74) *Attorney, Agent, or Firm* — Stetina Brunda Garred & Brucker

(57) ABSTRACT

A foam filler is provided with a base for forming a foam and placed inside a hollow structure having a through hole. An opening having an area larger than the opening of the through hole is created in the base and surrounding the through hole. The foam filler is provided with an upper wall which follows the flow and the thermal expansion of the base at the time of heating. The upper wall closes at least part of the opening of the through hole when following the flow and the thermal expansion of the base, and thus prevents the base from entering into the through hole. The upper wall is provided in a peripheral portion of the opening and placed in a part of an area surrounding the through hole.

9 Claims, 3 Drawing Sheets

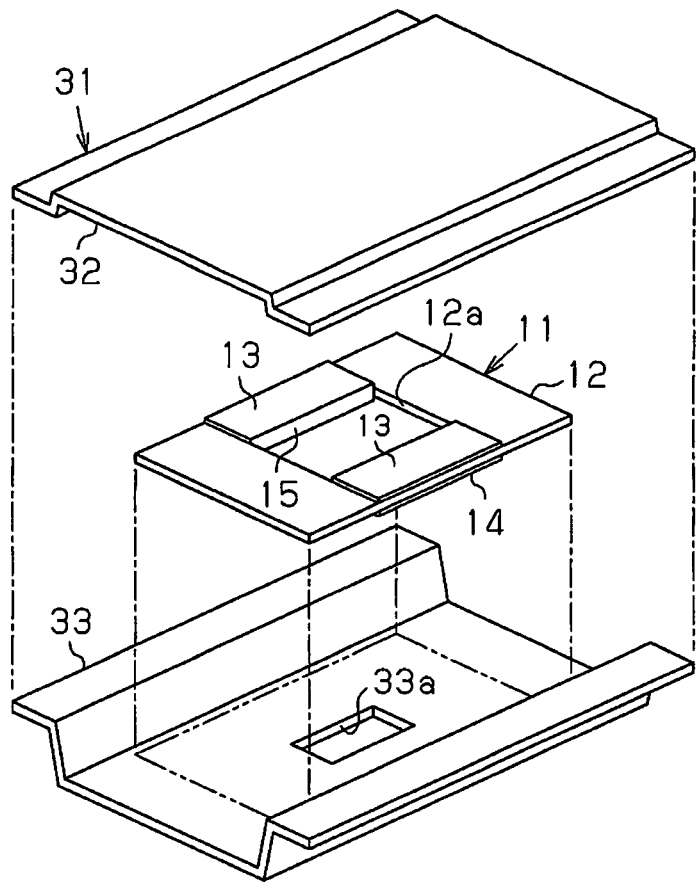
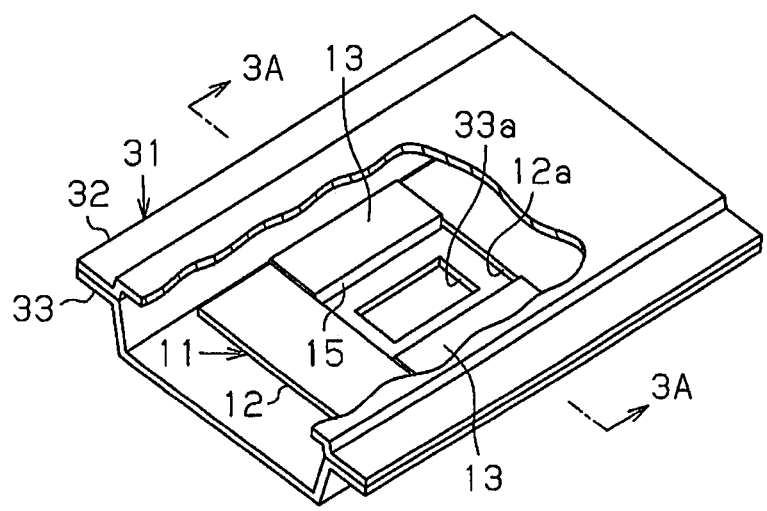

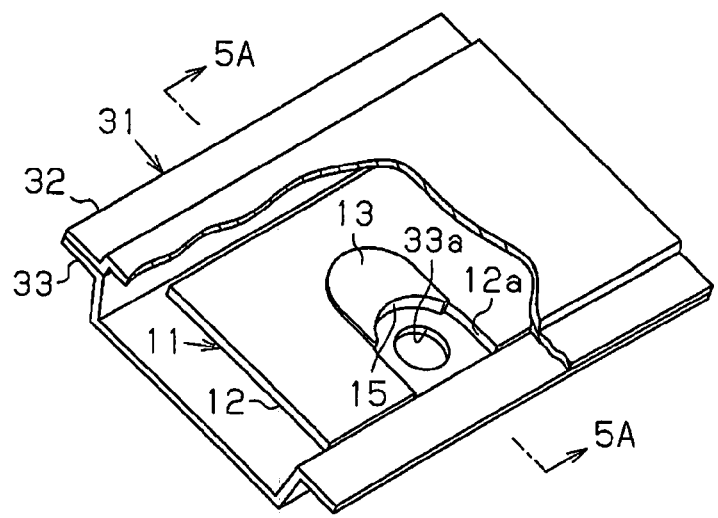
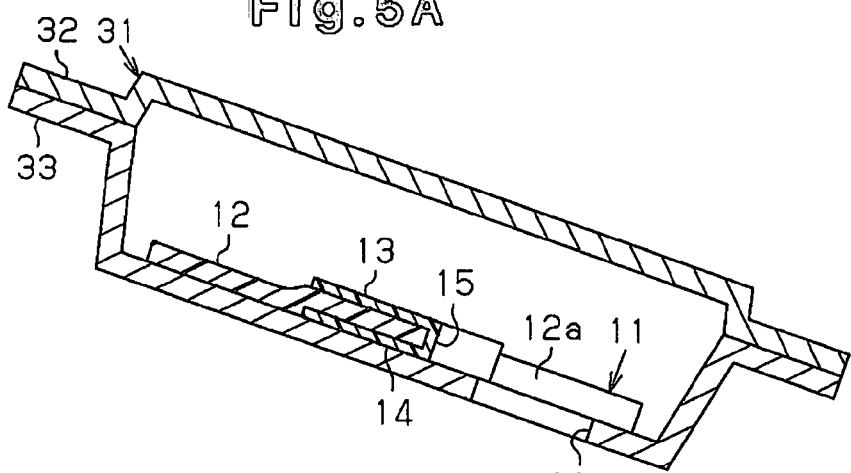
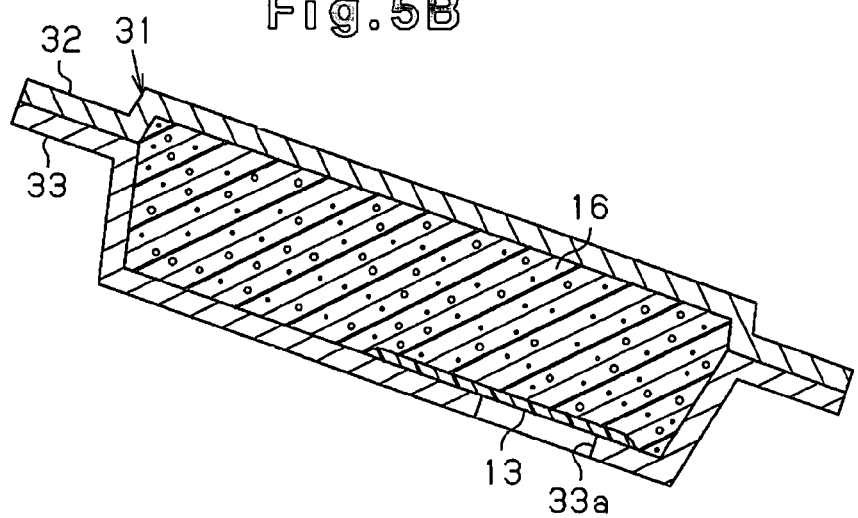

FOAM FILLER AND HOLLOW STRUCTURE

BACKGROUND OF THE INVENTION

The present invention relates to a foam filler for forming foam inside a hollow structure and filling the inner space of the hollow structure with foam, and to a hollow structure with such a foam filler.

Pillars in vehicles have inner panels and outer panels, for example, which are formed integrally, and thus, have hollow structures. The inner space of these hollow structures is filled with a foam, and thus, vibration in the hollow structure is suppressed, and noise caused by such vibrations are dampened. In addition, the air in the inner space of the hollow structures can be prevented from circulating because of the foam filling the inner space, and noises caused by such circulation of the air are dampened. Thus, noises caused in the hollow structure in vehicles, for example, are dampened, and as a result, the inside of the vehicle is quieter. Conventional foam fillers having a base for forming foam through heating are used to fill the inner space of hollow structures with foam. Such foam fillers are placed inside the hollow structure and heated together with the hollow structure, and thus, the inner space of the hollow structure is filled with the foam.

In general, panels which form a hollow structure have through holes, which are used, for example, for conveyance of the hollow structure, assembly of the hollow structure, and positioning of a number of panels. Such through holes usually become unnecessary after having served these functions. That is to say, there is a risk that the through holes may become holes through which air flows into the hollow structure after use, and become a factor in the creation of noise, for example. Therefore, it is preferable for the through holes after use to be covered with foam as that described above. Furthermore, portions where through holes are created are filled with foam, and thus, vibration of the hollow structure is preferably suppressed. However, when portions where through holes are created are filled with foam, the formed foam may swell out from the hollow structure through the through holes. Portions of the foam that swell out from the hollow structure in this manner are unnecessary. Furthermore, foam that swells out a great deal causes problems after filling in that the foam that fills the inner space prevents interior parts from being attached along the hollow structure. If the foam that swells out is visible, the foam degrades ornamentality. Japanese Laid-Open Patent Publication No. 2001-153231 discloses a foam filler which prevents foam from swelling out from through holes when formed. This foam filler is formed of a base which foams through heating and a net provided on the surface which is joined to a structure. The net has a mesh which is smaller than the through holes provided in the structure, and is arranged on the base so as to coat the through holes in the structure. In this foam filler, the net for covering the through holes prevents the foam from entering the through holes when the base is foamed through heating.

Some of the through holes created in the hollow structure are not used at all after a foam filler is provided inside the hollow structure, and other through holes are used after provision of a foam filler. In the above described conventional foam filler, the base is provided with a net covering the through holes, and therefore, the through holes are clogged with the foam filler in a state where the foam filler is provided in the hollow structure. Accordingly, the through holes are prevented from being used by the provided foam filler after provision of the foam filler in the hollow structure. During the process in which, for example, a hollow structure is attached to a vehicle after provision of a foam filler, through holes which allow an industrial robot arm to grasp the hollow structure are prevented from being used by the foam filler. In addition, during electrodeposition coating of a vehicle body, for example, the foam filler prevents liquid for electrodeposition that has entered the hollow structure from being efficiently discharged through the through holes. That is to say, there is a problem with conventional foam fillers in that through holes are prevented from being used after provision of a foam filler, though the foam is prevented from swelling out through the through holes when portions where through holes are created are efficiently filled with the foam.

SUMMARY OF THE INVENTION

An objective of the present invention is to provide a foam filler which makes it possible to use through holes after provision of the foam filler in a hollow structure, and which prevents the foam from swelling out from the through holes when portions where through holes are created are efficiently filled with the foam, and a hollow structure having the foam filler.

To achieve the foregoing objective and in accordance with one aspect of the present invention, a foam filler for filling inner space in a hollow structure with foam is provided. The foam filler is for placement inside the hollow structure which has a through hole connecting to the inner pave. The foam filler includes a base, an opening, and a movable body. The base foams due to heating after provision of the foam filler inside the hollow structure, forms the foam when cured, and flows and thermally expands when heated. The opening is created in the base, and has an area greater than the opening of the through hole and surrounding the through hole. The moveable body is provided in a peripheral portion of the opening and located in a part of an area surrounding the through hole in which the moveable body follows the flow and the thermal expansion of the base and prevents the base from entering the through hole by closing at least part of the through hole as a result of the following of the flow and the thermal expansion of the base.

In accordance with a second aspect of the present invention, a hollow structure including a through hole, an inner space connected to the through hole, and a foam filler for filling the inner space with foam is provided. The foam filler includes a base, an opening, and a movable body. The base foams due to heating after provision of the foam filler inside the hollow structure, forms the foam when cured, and flows and thermally expands when heated. The opening is created in the base, and has an area greater than the opening of the through hole and surrounding the through hole. The moveable body is provided in a peripheral portion of the opening and located in a part of an area surrounding the through hole in which the moveable body follows the flow and the thermal expansion of the base and prevents the base from entering the through hole by closing at least part of the through hole as a result of the following of the flow and the thermal expansion of the base.

BRIEF DESCRIPTION OF THE DRAWINGS

FIG. 1 is an exploded perspective view showing a foam filler and a hollow structure according to one embodiment;

FIG. 2 is a partially cut-out perspective view showing the hollow structure in which the foam filler is provided;

FIG. 4 is a partially cut-out perspective view showing a foam filler according to a modification and a hollow structure;

FIG. 5A is a cross-sectional view taken along line 5A-5A in FIG. 4; and

FIG. 5B is a cross-sectional view showing the hollow structure when filled with foam.

DETAILED DESCRIPTION OF THE PREFERRED EMBODIMENTS

Figure 3A:
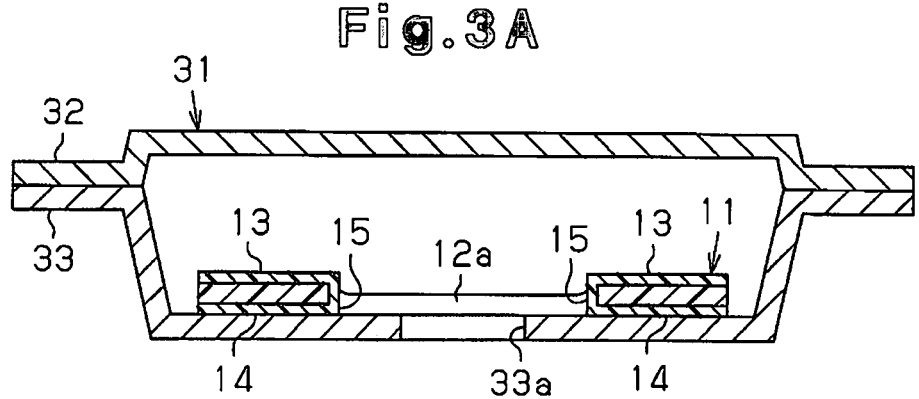
FIG. 3A is a cross-sectional view taken along line 3A-3A in FIG. 2.

In the following, a foam filler used in a hollow structure for a vehicle according to one embodiment of the present invention will be described in detail with reference to FIGS. 1 to 3. As shown in FIGS. 1 and 2, a hollow structure 31 is provided with an outer panel 32 which is placed so as to face the outside of the vehicle, and an inner panel 33 which is placed so as to face the inside of the vehicle. The outer panel 32 and the inner panel 33 are joined and integrated, and thus, a space is created inside the hollow structure 31. A rectangular through hole 33a is created in the inner panel 33, and the inner space and the outer space of the hollow structure 31 are connected through this through hole 33a. A foam filler 11 which is placed inside the hollow structure 31 forms a foam through heating, and the inner space of the hollow structure 31 is filled with this foam.

The foam filler 11 is provided with a base 12 which is foamed through heating, and forms a foam when cured. The base 12 according to the present embodiment is in a rectangular plate form, and a rectangular opening 12a is created in the center portion of the base 12. The area of the opening 12a is greater than the area of the opening of the through hole 33a of the inner panel 33, and the opening 12a surrounds the through hole 33a in the inner panel 33.

The material for forming the base 12, for example, contains a base material, a foaming agent, and a cross linking agent, and in addition, contains an appropriate filling agent, plasticizing agent and the like. As the base material, synthetic resins, elastomers, and rubbers may be used. As synthetic resins, polyolefins, epoxy resins, phenol resins, urethane resins, acryl resins, styrene resins, and EVA (ethylene/vinyl acetate copolymers) may be used. As elastomers, RB (polybutadiene elastomers), SBS (styrene/butadiene/styrene block copolymers), SIS (styrene/isoprene/styrene block copolymers) and SEBS (styrene/ethylene/butylene/styrene block copolymers) may be used. As rubbers, NR (natural rubber), SBR (styrene/butadiene rubber), BR (butadiene rubber), NBR (nitride rubber), CR (chloroprene rubber), IR (isoprene rubber), IIR (butyl rubber), EPDM (ethylene propylene diene ternary copolymers), UR (urethane rubber), ENR (epoxidized natural rubber) and EPM (ethylene/propylene rubber) may be used. As foaming agents, azodicarbonamide and dinitropentamethylene tetramine may be used. As cross linking agents, publicly known dimethylurea and dicyandiamide may be used. As filling agents, calcium carbonate, barium sulfate, ferrite, and silica may be used. The functions required for the foam include increasing the rigidity of the hollow structure 31, reinforcing the hollow structure 31, a sound absorption, and impact absorption, in addition to sound insulation and vibration damping.

The base 12 may be manufactured by punching out a plate in the direction of the thickness after forming a plate by extruding the material in plate form, for example. In addition, the base 12 may also be manufactured through injection molding using a die.

A pair of upper walls 13 are provided on the base 12 as moveable bodies, and follow the flow or thermal expansion of the base 12 at the time of heating. The upper walls 13 are provided in the peripheral portion of the opening 12a and placed around the through hole 33a. The upper walls 13 close at least part of the through hole 33a when following the flow or thermal expansion of the base 12 as described above, and thus, prevent the base 12 from entering the through hole 33a. As shown in FIG. 3A, the upper walls 13 according to the present embodiment are formed so as to be integrated with bottom walls 14 which are supports which intervene between the base 12 and the inner panel 33 through side walls 15 which are placed against the inner surface of the opening 12a. That is to say, the upper walls 13 and the bottom walls 14 pinch the peripheral portion of the opening 12a through the side walls 15.

The respective upper walls 13 according to the present embodiment face each other in the peripheral portion of the opening 12a, and face each other around the through hole 33a. Thus, the pair of upper walls 13 are placed in a part of an area surrounding the through hole 33a in such a state as to face each other, and the entirety of the through hole 33a is easily closed.

The upper walls 13, the side walls 15, and the bottom walls 14 according to the present embodiment are formed of a sheet material. The upper walls 13 are formed of a sheet material as described above, and thus, the configuration of the moveable bodies is simplified. An appropriate material for forming the upper walls 13, that is to say, an appropriate material for the sheet material, may be selected taking into consideration the required function of preventing the base 12 from entering the through hole 33a. In order to prevent the base 12 from entering the through hole 33a in an appropriate manner, for example, a material having a higher viscosity than the material for forming the base 12 is appropriate as the material for forming the upper walls 13 in the process through which a foam is formed from the base 12. As the material for forming the upper walls 13, materials of which the base material is a polymer material or a metal material may be used. As polymer materials, synthetic resins, elastomers and rubbers may be used, and polymer materials of which the properties in terms of the viscosity are adjusted by mixing an additive, such as a filling agent, into the polymer material if necessary are appropriate for use. In addition, as the sheet material, polymer sheets, metal foils, unwoven cloth and cloth may be used.

As the material for forming the upper walls 13, a material of which the base material is at least one type of polymer material selected from among synthetic resins, elastomers and rubbers is appropriate. Upper walls 13 formed of such a polymer material have excellent adhesion to the base 12 and the foam formed from this base 12. Therefore, appropriate foam pressure is applied to the entirety of the upper walls 13 from the base 12 during the process of foaming and curing the base 12, and as a result, a foam is gained without any hindrance and foamed as desired, and in addition, the space is sufficiently filled. It is possible for the upper walls 13 formed of a polymer material to have functions of, for example, damping vibration of the upper walls 13. The upper walls 13 are preferably formed of a polymer sheet because this allows the configuration to be simplified and functions of damping vibration, for example, to be gained.

It is preferable for the upper walls 13 to have adhesiveness with the base 12, because this makes it easy for the upper walls 13 to follow the flow or the thermal expansion of the base 12. Therefore, the upper walls 13 are preferably formed of a polymer sheet having adhesiveness. The bottom walls 14 prevent the opening 12a from shifting in position relative to the through hole 33a, and therefore, preferably have adhesiveness with the base 12 and the inner panel 33.

The upper walls 13, the side walls 15, and the bottom walls 14 are provided on the base 12 through pasting in such a manner that an adhesive layer is provided on a sheet material, through adhesion using the adhesiveness of the sheet material, or through insertion molding using a die. The upper walls 13, the side walls 15, and the bottom walls 14 according to the present embodiment are pasted on the base 12 using the adhesiveness of the sheet material.

As shown in FIG. 2, foam filler 11 according to the present embodiment is provided inside the hollow structure 31 when the inner panel 33 and the outer panel 32 are joined together after the bottom walls 14 are pasted to the inner panel 33. At this time, as shown in FIGS. 2 and 3A, the opening 12a in the foam filler 11 surrounds the through hole 33a and the upper walls 13 are placed in a part of the area surrounding the through hole 33a. The through hole 33a in the hollow structure 31 may be a through hole 33a which is used after provision of the foam filler 11 inside the hollow structure 31. Such a through hole 33a may be a through hole 33a which allows an industrial robot arm to grasp the hollow structure 31 without failure during the process of assembly of the hollow structure 31, and a through hole 33a through which a liquid for electrodeposition that has entered the hollow structure 31 is efficiently discharged during electrodeposition coating of the vehicle body. The foam filler 11 according to the present embodiment allows the through hole 33a to connect the inner space and the outer space of the hollow structure 31 through the opening 12a even after provision of the foam filler 11 in the hollow structure 31. Therefore, the through hole 33a is appropriate for use even after provision of the foam filler 11.

Figure 3B:
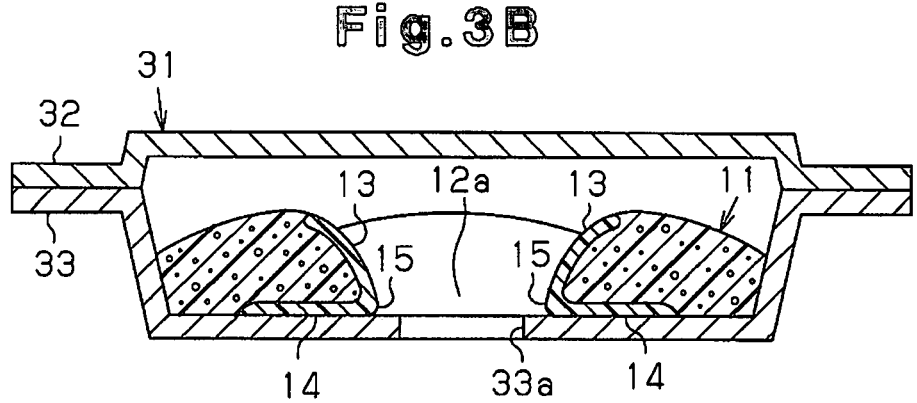
FIG. 3B is a cross-sectional view showing a process for foaming a base.
Figure 3C:
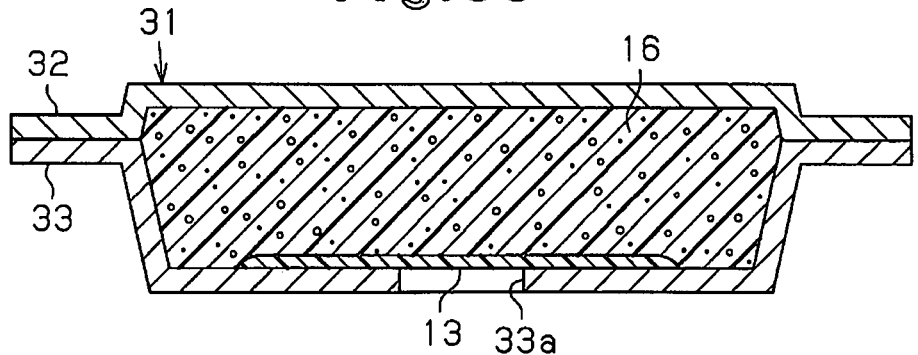
FIG. 3C is a cross-sectional view showing the hollow structure when filled with a foam.

The hollow structure 31 in which the foam filler 11 is provided is heated when the vehicle passes through a drying furnace during the process for drying the vehicle, for example. Then, as the temperature of the base 12 rises, the base 12 gradually becomes fluid. In addition, as the temperature of the base 12 rises, the base 12 starts foaming. That is to say, the base 12 thermally expands as the temperature rises. As shown in FIG. 3B, the upper walls 13 follow the flow and the thermal expansion of the base 12. According to the present embodiment, the bottom walls 14 intervene between the base 12 and the inner panel 33, and therefore, movement of the bottom walls 14 is restricted. Meanwhile, the upper walls 13, which are formed so as to be integrated with the bottom walls 14, follow the flow and the thermal expansion of the base 12 in such a state as to be supported by the bottom walls 14. That is to say, the upper walls 13 unfold relative to the bottom walls 14, and move in such a direction that the through hole 33a is closed. The upper walls 13 follow the flow and the thermal expansion of the base 12 in this manner, and thus, the upper walls 13 first reach the through hole 33a. Then, the upper walls 13 smoothly close the opening of the through hole 33a and the upper walls 13, which close the opening of the through hole 33a as shown in FIG. 3C, prevent the base 12 from entering into the through hole 33a in an appropriate manner.

In such a state that the base 12 is prevented from entering the through hole 33a, the foamed base 12 is cured, so that foam 16 is formed, and at the same time, the portion where the through hole 33a is created is appropriately filled with this foam 16.

In the hollow structure 31 which is filled with foam 16, vibration of the hollow structure 31 is damped and circulation of air inside the hollow structure 31 is prevented, for example. Therefore, the inside of the vehicle where the hollow structure 31 is mounted is quieter.

The advantages gained in accordance with the present embodiment are described in the following.

(1) The base 12 is provided with upper walls 13 which follow the flow and the thermal expansion of the base 12 at the time of heating. In addition, the upper walls 13 are provided in the peripheral portion of the opening 12a and placed in a part of the area surrounding the through hole 33a, so that the opening of the through hole 33a is closed when heated, and thus, the base 12 is prevented from entering the through hole 33a. Therefore, an appropriate foam 16 is formed in the inner space of the hollow structure 31. That is to say, foam 16 is prevented from swelling out from the through hole 33a. As a result, it becomes unnecessary to remove portions of foam 16 that swells out from the through hole 33a, and interior parts and the like are easily attached along the hollow structure 31. In addition, foam 16 is prevented from swelling out and thus does not become visible. Accordingly, ornamentality is not degraded.

Furthermore, the opening 12a of the base 12 surrounds the through hole 33a, and therefore, the portion where the through hole 33a is created is efficiently closed by foam 16. In addition, the upper walls 13 are placed in a part of the area surrounding the through hole 33a before heating is started after the foam filler 11 is provided inside the hollow structure 31, and thus, the through hole 33a is appropriate for use.

(2) The upper walls 13 are formed so as to be integrated with the bottom walls 14 which intervene between the base 12 and the inner panel 33, and have a structure where the upper walls 13 and the bottom walls 14 pinch the peripheral portion of the opening 12a. Therefore, when the base 12 is heated, the movement of the bottom walls 14 is restricted, while the upper walls 13 formed so as to be integrated with the bottom walls 14 move in such a state as to be supported by the bottom walls 14. That is to say, the upper walls 13 unfold relative to the bottom walls 14 and move in such a direction that the though hole 33a is closed when the upper walls 13 follow the flow and the thermal expansion of the base 12, and the upper walls 13 smoothly reach the through hole 33a. As described above, the upper walls 13 smoothly close the opening of the through hole 33a, and therefore, the advantage of preventing foam 16 from swelling out from the through hole 33a is enhanced.

(3) The bottom walls 14 have adhesiveness with the base 12 and the inner panel 33. Therefore, the opening 12a is prevented from shifting in position relative to the through hole 33a. Accordingly, the opening 12a is prevented from shifting in position and hindering use of the through hole 33a after the foam filler 11 is provided, and the through hole 33a is used in a more appropriate manner. Furthermore, when the opening 12a is prevented from shifting in position, as shown in FIG. 3C, the portion where the through hole 33a is created is easily filled in with foam 16 without failure. In addition, movement of the bottom walls 14 is restricted as a result of the adhesiveness, after heating of the base 12 is started. Therefore, the upper walls 13 unfold relative to the bottom walls 14, and move toward the through hole 33a more smoothly. As described above, the upper walls 13 close the opening of the through hole 33a more smoothly, and thus, the effects of preventing foam 16 from swelling out from the through hole 33a is enhanced.

(4) The upper walls 13 have adhesiveness with the base 12. Accordingly, it becomes easy for the upper walls 13 to follow the flow and the thermal expansion of the base 12, due to the adhesiveness of the upper walls 13 with the base 12. Therefore, the upper walls 13 smoothly reach the through hole 33a. As described above, the upper walls 13 close the opening of the through hole 33a more smoothly, and therefore, the advantage of preventing foam 16 from swelling out from the through hole 33a is enhanced.

(5) The upper walls 13 are made of a sheet material, and therefore, the configuration of the upper walls 13 is simplified. Furthermore, it is easy to reduce the amount of material for the upper walls 13 and close the through hole 33a having a greater area in the opening. In addition, the upper walls 13 according to the present embodiment are formed of a sheet material so as to be integrated with the bottom walls 14, and therefore, the configuration of the foam filler 11 having the upper walls 13 and the bottom walls 14 is simplified.

The above described embodiment may be modified as follows.

The opening 12a is not limited to being rectangular, and the above described opening 12a may be modified so as to be, for example, in circular form or triangular form. In addition, a number of openings 12a may be provided in accordance with the number of through holes 33a, for example.

The location where the opening 12a is created in the base 12 may be changed to an appropriate location in accordance with the location where the through hole 33a is created in the inner panel 33. As shown in FIG. 4, for example, the opening 12a may be created in a peripheral portion of the base 12 in accordance with the location of the through hole 33a.

The base 12 is not limited to being rectangular, and may be modified so as to be in any appropriate form other than rectangular, for example in polygonal form or circular form, in accordance with the form on the inside of the hollow structure. In addition, the base 12 is not limited to being in plate form, and may be modified so as to be in, for example, block form.

The form and number of the upper walls 13 are not particularly limited. As shown in FIGS. 4 and 5A, for example, one upper wall 13 in tongue form may be provided. As shown in FIG. 5B, this moveable body can also close the through hole 33a.

The side walls 15 may be omitted so that the upper walls 13 and the bottom walls 14 are integrally formed.

The upper walls 13 and the bottom walls 14 may be formed of different materials. In addition, the form of the upper walls 13 and the form of the bottom walls 14 may be different.

Although the above described upper walls 13 are formed so as to close the entirety of the through hole 33a, the upper walls 13 may be formed so as to close only part of the through hole 33a. In this configuration also, the upper walls 13 prevent the base 12 from entering the through hole 33a, and thus, the formed foam 16 is prevented from swelling out from the through hole 33a.

The bottom walls 14 may be omitted so that only the upper walls 13 close at least part of the opening of the through hole 33a. In the case where the bottom walls 14 are omitted, an adhesive layer using an adhesive or a viscous layer using a viscous material intervenes between the base 12 and the inner panel 33 so that the base 12 is secured to the inner panel 33. In addition, the base 12 may be formed of a material having adhesiveness, and the base 12 may be pasted and secured to the inner panel 33.

The moveable bodies are not limited to the upper walls 13. The side walls 15, for example, may be formed as moveable bodies which close at least part of the opening of the through hole 33a in accordance with the thickness of the base 12.

The applications for the through hole 33a are not particularly limited, and the through hole 33a may be used for positioning the hollow structure 31 on a vehicle when the hollow structure 31 is attached to a vehicle, for example. That is to say, as long as the through hole is used before heating after provision of the foam filler 11, the same advantages as the above described foam filler 11 are gained.

The foam filler 11 may allow the entirety of the inner space of the hollow structure 31 to be filled with foam 16, or only a predetermined portion of the inner space to be filled with foam 16.

Although the above described hollow structure 31 is placed horizontally, foam filler 11 may be applied to the hollow structure 31, which is inclined, as shown in FIGS. 4 and 5A. In the hollow structure 31 which is inclined in this manner, as shown in FIG. 5B, the through hole 33a can be closed by the upper wall 13, and the base 12 is prevented from entering into the through hole 33a.

The panel in which the foam filler 11 is placed is not limited to the above described inner panel 33. That is to say, the form of the hollow structure, the number of panels forming the structure and the like are not particularly limited.

Applications for the hollow structure are not particularly limited. The present invention may be applied to such hollow structures as pillars, covers, door panels and locker panels for vehicles, and hollow structures for panels in buildings.

What is claimed is:

1. An apparatus for filling inner space in a hollow structure, the apparatus being disposable inside the hollow structure adjacent to a through hole connecting to the inner space, the apparatus comprising:
   a base which is located inside the hollow structure, and wherein the base has a flow and a thermal expansion when heated, and forms a foam;
   a moveable body pivotal in relation to the base and disposed over the base so as to be disposed at a peripheral portion of an opening of the base and operative to follow the flow and the thermal expansion of the base and mitigate the base from entering the through hole of the hollow structure by pivoting to close at least part of the through hole of the hollow structure as a result of the following of the flow and the thermal expansion of the base;
   a support interposed between the base and the hollow structure; and
   a side wall that connects the support with the movable body and located against an inner surface of the opening of the base;
   wherein the moveable body, the support and the side wall are formed as a unitary sheet material so as to be integrated with one another, and the moveable body and the support hold the peripheral portion of the opening of the base in between.

2. The apparatus according to claim 1, wherein the support is adhered to the base and the hollow structure.

3. The apparatus according to claim 1, wherein the moveable body is adhered to the base.

4. The apparatus according to claim 1, further comprising another moveable body, wherein said moveable body and another moveable body form a pair of moveable bodies facing each other wherein the moveable body and the another moveable body defines the opening of the base.

5. A structure comprising:
   a hollow body having a plate with a through hole which is connected to an inner space of the hollow body;
   an apparatus for filling the inner space of the hollow body, the apparatus being disposable completely within the inner space of the hollow body and on an inner surface of the plate, the apparatus including:
      a base which is located inside the hollow body, and wherein the base has a flow and a thermal expansion when heated, and forms a foam;

wherein the base has an opening, the opening having an area greater than the opening of the through hole of the hollow body and surrounding the through hole;

a moveable body provided in a peripheral portion of the opening of the base and located in a part of an area surrounding the through hole of the hollow body in which the moveable body follows the flow and the thermal expansion of the base and pivots with respect to the base so as to close at least a part of the through hole of the hollow body and prevent the base from entering the through hole of the hollow body as a result of the following of the flow and the thermal expansion of the base;

a support interposed between the base and the hollow body; and a side wall that connects the support with the movable body and placed against an inner surface of the opening of the base;

wherein the moveable body, the support and the side wall are formed as a unitary sheet material so as to be integrated with one another, and the moveable body and the support hold the pheripheral portion of the opening in between, and wherein the moveable body is pivotally attached to the support via the side wall.

6. The structure according to claim 5, wherein the support is adhered to the base and the hollow body.

7. The structure according to claim 5, wherein the moveable body is adhered to the base.

8. The structure according to claim 5, wherein the apparatus includes a pair of moveable bodies, and the pair of moveable bodies face each other across the opening of the base.

9. The structure according to claim 5, which is for use for a vehicle.

* * * * *